No. 782,424. PATENTED FEB. 14, 1905.
H. A. W. SMITH.
PITMAN CONNECTION.
APPLICATION FILED AUG. 3, 1904.
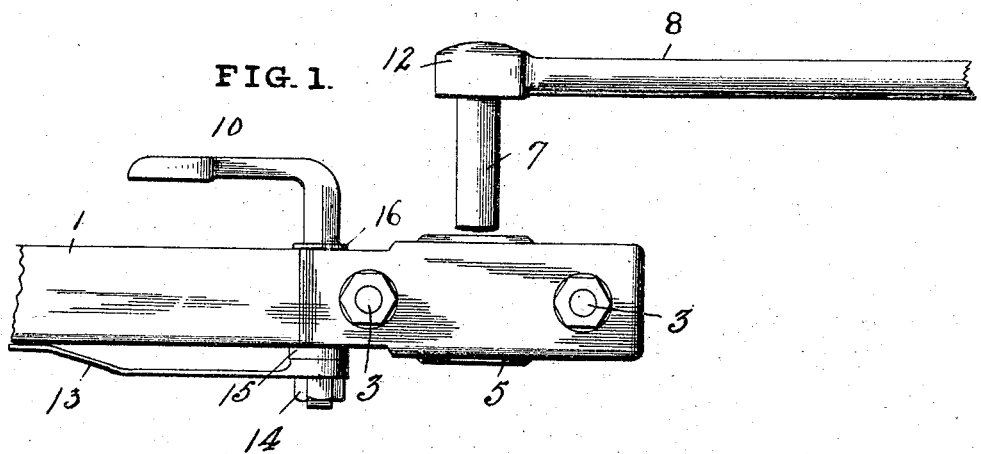
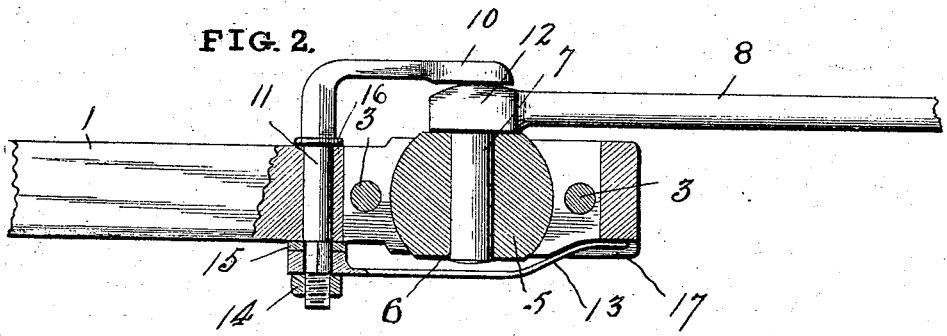
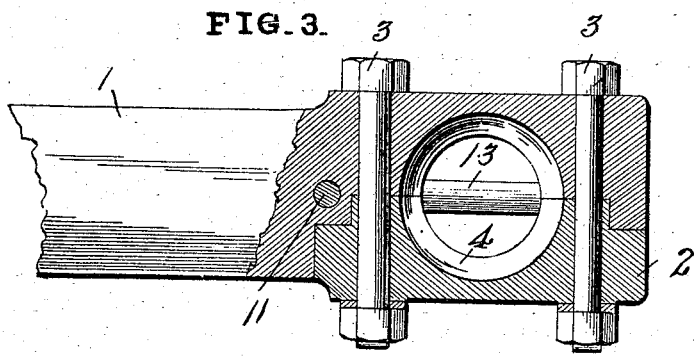
Witnesses
Chas. K. Davis.
M. E. Brown
Inventor
H. A. W. Smith
by W. A. Bartlett
Attorney No. 782,424.

Patented February 14, 1905.

UNITED STATES PATENT OFFICE.

HENRY A. W. SMITH, OF WHITTLES, VIRGINIA.

PITMAN CONNECTION.

SPECIFICATION forming part of Letters Patent No. 782,424, dated February 14, 1905.

Application filed August 3, 1904. Serial No. 219,274.

*To all whom it may concern:*

Be it known that I, HENRY A. W. SMITH, a citizen of the United States, residing at Whittles, in the county of Pittsylvania and State of Virginia, have invented certain new and useful Improvements in Pitman Connections, of which the following is a specification.

This invention relates to pitman-rod connections for use with cutters of reaping-machines and for like purposes where a movement other than a right-line movement is desirable.

The object of the invention is to make a pitman-rod connection which will permit the driven part or bar to be turned to any position within the limit of movement and still have a connection with the pitman, so as to permit free working of the parts; also, to permit the ready coupling and uncoupling of the pitman and its connections.

Figure 1 is an elevation of the pitman, the driven bar, and the holding-button in uncoupled relation. Fig. 2 is an elevation, partly in section, of the same parts coupled. Fig. 3 is a section of the socket for coupling ball or spheroid.

The cutter-bar, head, or other part driven by the pitman is indicated by 1. This bar is cut away near one end, and a bearing-block 2 is attached to part 1 by bolts 3 3. The bearing-block or cap 2 and the bar 1 have between them a spheroidal socket 4, which socket receives the coupling ball or spheroid 5. The socket 4 is of such size that the spheroid 5 fits neatly therein, with opposite faces slightly projecting. The cap 2 can be removed and ball or spheroid 5 removed and replaced when desirable. Through the spheroid 5 there is a cylindrical bore 6, and a pin 7 on the pitman 8 enters said bore. As the spheroid 5 can work in its socket 4 in all directions, it is not essential that the bar 1 shall move in right line with the piston, although when coupled, as in Fig. 2, the bar 1 must move with the pitman 8. As the bar 1 must frequently stand or move at various angles to the pitman, this adjustment is highly important.

The bar 1 carries a turn-button 10, which is in form a lever or arm, with its pivot 11 passing through a bearing in the bar 1. The button or lever 10 can thus be swung over the convex shoulder 12 of pitman 8 when the parts are coupled, and in such position the coupling of the pitman with the bar will be maintained; but by swinging back lever or button 10, as in Fig. 1, the pin 7 may be slipped from its bearing in the ball or spheroid 5.

The pivot 11 of the button or lever 10 extends through bar 1, and a spring 13 is held to the end of said pivot by a nut 14 or in other convenient manner. Washers are usually interposed between the pivot and bar, as at 15 16. The free end of spring 13 drops into a notch or recess 17 in bar 1 and when in such position holds the button or lever 10 from turning, so that the button must maintain its position above the shoulder 12 and the parts remain coupled. By springing the free end of spring 13 out of notch 17 and turning the spring and button or lever to one side, as in Fig. 1, the parts can readily be uncoupled. A flat spring 13, held to pivot 11, so that the two must turn together, is the preferred means, as shown, for holding the parts coupled.

My pitman-coupling gives all the adjustability needed in mowing and similar machines and gives great facility for coupling and uncoupling and for repairs.

What I claim is—

1. A pitman provided with a pin extending from one side, a ball or spheroid having a cylindrical bore to receive said pin, a driven bar having a socket in which said ball or spheroid rests, and a turn-button pivoted in the driven bar and swinging above the pitman, all combined.

2. In a pitman-coupling, the combination of the pitman having a pin projecting from its side, a ball having an opening to receive said pin, a bar with a socket to receive said ball, a turn-button pivoted to the bar and swinging above the pitman, and a spring connected to the turn-button to hold it from turning.

3. In a pitman-coupling, the combination of a pitman having a pin projecting from its side, a ball having a recess into which said pin projects, a bar having a socket which receives said ball, a turn-button on the bar having a pivot passing through the same and an arm to swing above the pitman, and a flat spring secured to said pivot and engaging a notch in the bar to prevent the turn-button from turning.

In testimony whereof I affix my signature in presence of two witnesses.

HENRY A. W. SMITH.

Witnesses:
WILLIAM SMITH,
E. S. REID.